US006823795B2

(12) United States Patent
Willcocks et al.

(10) Patent No.: US 6,823,795 B2
(45) Date of Patent: Nov. 30, 2004

(54) METHOD AND APPARATUS FOR FORMING MULTICOLOR REGISTERED IMAGES ON EDIBLE PIECES

(75) Inventors: Neil A. Willcocks, Flanders, NJ (US); James M. Suttle, East Stroudsburg, PA (US); Thomas M. Collins, Nazareth, PA (US); Arun Shastry, Neshanic Station, NJ (US)

(73) Assignee: Mars, Inc., McLean, VA (US)

( * ) Notice: Subject to any disclaimer, the term of this patent is extended or adjusted under 35 U.S.C. 154(b) by 0 days.

(21) Appl. No.: 09/859,141

(22) Filed: May 16, 2001

(65) Prior Publication Data

US 2002/0170446 A1 Nov. 21, 2002

(51) Int. Cl.[7] .......................... B41M 1/40; B41F 17/30; A23P 1/08
(52) U.S. Cl. .................. 101/492; 101/35; 101/491; 101/211; 426/383
(58) Field of Search ................ 101/35, 36, 37, 101/38.1, 151, 211, 171, 174, 175, 177, 481, 485, 491, 492, 493, DIG. 40; 426/383

(56) References Cited

U.S. PATENT DOCUMENTS

| 3,255,695 A | * | 6/1966 | Johnson et al. ............. 101/170 |
| 4,135,960 A | * | 1/1979 | Shuppert et al. ............ 101/175 |
| 4,445,432 A | * | 5/1984 | Ford et al. ................... 101/152 |
| 4,519,310 A |   | 5/1985 | Shimizu et al. |
| 4,672,892 A | * | 6/1987 | Ackley ........................ 101/35 |
| 5,006,362 A | * | 4/1991 | Hilborn ..................... 427/2.23 |
| 5,423,252 A |   | 6/1995 | Yamamoto et al. |
| 5,758,580 A | * | 6/1998 | Murray ....................... 101/491 |
| 6,314,876 B1 | * | 11/2001 | Ackley ....................... 101/44 |

FOREIGN PATENT DOCUMENTS

| FR | 464379 | 3/1914 |
| FR | 2737438 | 2/1997 |
| GB | 2 186 782 A | * 8/1987 |
| JP | 09-39366 | 2/1997 |

OTHER PUBLICATIONS

English abstract of FR 2737438 published Feb. 7, 1997.*
Application No. 09/479,549 published as U.S. Pub. No. 2003/0035870 A1.

* cited by examiner

Primary Examiner—Leslie J. Evanisko
(74) Attorney, Agent, or Firm—Fitzpatrick, Cella, Harper & Scinto

(57) ABSTRACT

Multicolor registered images, formed from at least two component images, are printed on the surfaces of shaped edible pieces. Registration of the component images is maintained by applying the component images to a single image transfer surface from plural image application surfaces. The registered image is applied to a shaped edible piece from the image transfer surface in a single contact step.

19 Claims, 8 Drawing Sheets

METHOD AND APPARATUS FOR FORMING MULTICOLOR REGISTERED IMAGES ON EDIBLE PIECES

BACKGROUND OF THE INVENTION

1. Field of the Invention

The present invention relates to a method of printing registered images onto edible pieces, and particularly onto shaped edible pieces. The invention also relates to an apparatus for practicing the method of the invention and to edible pieces having a multicolor registered composite image on a planar or non-planar surface thereof.

2. Description of the Related Art

Many multicolor printing methods are known in the graphic arts which are capable of producing registered images on non-food products. These methods include relief printing, stamp-printing, offset printing, pad printing, flexographic printing, gravure printing, inkjet printing, and silk-screen printing. Application of such methods to multicolor registered printing on edible pieces, however, is difficult—particularly for printing onto non-planar surfaces. The handling of edible pieces entails different considerations from the handling of paper or polymer sheets, as edible pieces require more careful handling to prevent damage or misshaping of the pieces. Further, handling food generally requires higher cleanliness. As the inks must be edible, as well as the substrates, the artisan has a smaller universe of materials and methods from which to select to achieve the desired high resolution results. Due to these constraints, the high volume production of high resolution registered multicolor images on edible substrates is a difficult technical problem.

Methods for printing composite images onto large solid articles such as bottles and other storage cylinders using a single transfer roll are known. U.S. Pat. No. 4,519,310, for example, describes transferring a plurality of inks onto the outer periphery of a single ink form roller, pressing a cylindrical container against the ink form roller, and rotating the cylindrical container to transfer the ink images onto the cylindrical container. The method described in U.S. Pat. No. 4,519,310 however has not been adapted for printing edible inks onto shaped edible pieces.

Presently, at high speed mass production, designs applied to non-planar surfaces of edible pieces are generally limited to one-color designs (or multiple independent designs that can be of different colors, but are unrelated to each other) because it is very difficult to apply consecutive images in registry to non-planar surfaces of edible pieces.

Methods of forming composite or registered images on a confectionery are disclosed in copending U.S. application Ser. No. 09/479,549, herein incorporated by reference in its entirety. The apparatus and processes described therein are directed to a unique system of conveying the pieces in registration between printing stations. One component image of the registered image, typically a first color, is printed at a first print station and then a second image of a second color is printed in registration with the first image at a second print station to produce a complete registered image. Each print station is equipped with a separate transfer roll, as shown in FIG. 6 herein.

A drawback of such multiple-printing-station technology is the need for keeping the shaped edible pieces in registration between print stations. Vacuum systems, which may be used for this purpose, for example, consume excessive amounts of power and must be carefully maintained.

SUMMARY OF THE INVENTION

The present invention represents an advancement in the art in that it provides a method and apparatus for printing multicolor registered images on edible pieces without the necessity of means for maintaining the pieces in registering relationship between printing stations. The invention also provides a system of multicolor registered printing which can be readily retrofitted to existing confectionery printing technology.

Another advantage of the present invention is improved image registration compared to the existing technology. As good as the vacuum system is, there can still be some movement of the edible piece causing a degree of loss of registration. This problem is eliminated by printing the component images on a transfer roll where the system is not subject to movement.

The technology of the invention utilizes a single image transfer surface for printing a registered image on an edible piece. Instead of forming the components of the image on the edible piece at separate printing stations, a registered image is formed at different times on an image transfer surface. The entire registered image is then transferred onto the edible piece in one contact step.

Broadly, an apparatus for printing a multicolor registered image onto a surface of an edible piece according to the invention comprises a recess for holding an edible piece situated on a conveyer which moves the piece past an image transfer surface. The image transfer surface (which in preferred embodiments is the surface of a rotating cylinder) contacts the edible piece in the contact step which transfers the multicolored registered image onto the piece.

The apparatus requires at least first and second application surfaces for applying color medium to the image transfer surface, although three or more application surfaces may be used. The application surfaces are supplied with color media, such as food grade inks (white, black and other colors) by first and second edible color medium supplies.

First and second patterns of edible color medium (the component images) are applied by the application surfaces at different times onto the image transfer surface and then the registered image is transferred onto a surface of the edible piece in a single contact step.

This invention is also directed to an edible piece having a multicolored composite image formed from at least two component images of edible printing inks deposited on at least one non-planar surface of the edible shaped piece. Particularly preferred edible pieces include shaped confectionery pieces having lentil, oval, spherical, or the is like shaped confectionery, most preferably sugar shell coated confectionery such as for example, "M&M's®" Chocolate Candies pieces, "SKITTLES®" Bite Size Candies and the like.

DETAILED DESCRIPTION OF THE INVENTION

As used herein, a "registered image" means an image that is formed from at least two composite images of different colors. "Registration" means the tolerance at which the human eye recognizes that the two images together form a single image.

In general, the registered images described herein are edible, as are the edible pieces themselves. Thus, broadly understood, the invention includes the preparation of registered images using inks suitable for labelling pharmaceutical tablets and the like ("pharmaceutical grade inks"). However, in the most preferred embodiments, the invention contemplates the printing of multicolored images using food grade inks. Food grade inks meet an even higher threshold for toxicity and safety than pharmaceutical grade inks, and place even more stringent constraints on the printing process. The most preferred color media according to the invention are aqueous or alcohol/water based food grade inks. "Inks" in this context includes any colorant system, including pigment dispersions and dyes. Such inks are well-known to those of ordinary skill in the art and are readily available.

"Edible pieces," as used herein is an edible piece having either a planar or non-planar surface. Shaped edible pieces have a non-planar printing surface. The edible pieces used in the method of this invention can be any edible article such as, for example, candies, nuts, cookies, vitamin tablets, pharmaceutical tablets, capsules, caplets, panned confectioneries, pressed confectioneries, confectionery lentil pieces, rice, beans, pasta, pet food nuggets, pet food biscuits, ice cream, and the like. Preferably the edible pieces have a non-planar surface upon which the composite image is printed.

While any edible substrate is within the scope of the invention, the most preferred shaped edible pieces have a sugar shell outer coating. Such outer sugar shells serve many functions, including preserving the inner ingredients and presenting an attractive exterior. Further, the outer sugar shell can serve as a substrate on which an image or design is formed. Such images or designs can be, for example, an identifying trademark such as the "M" on "M&M's®" Chocolate Candies pieces.

In a preferred embodiment, the method of this invention forms multicolored registered images, composed of at least two component images, on shaped edible pieces by transferring the image in two stages using at least two application rolls onto a single image transfer roll to form a composite image and then applying the composite image to the shaped edible piece in a single contact step to form the multicolored registered image on the shaped edible piece.

Figure 1:
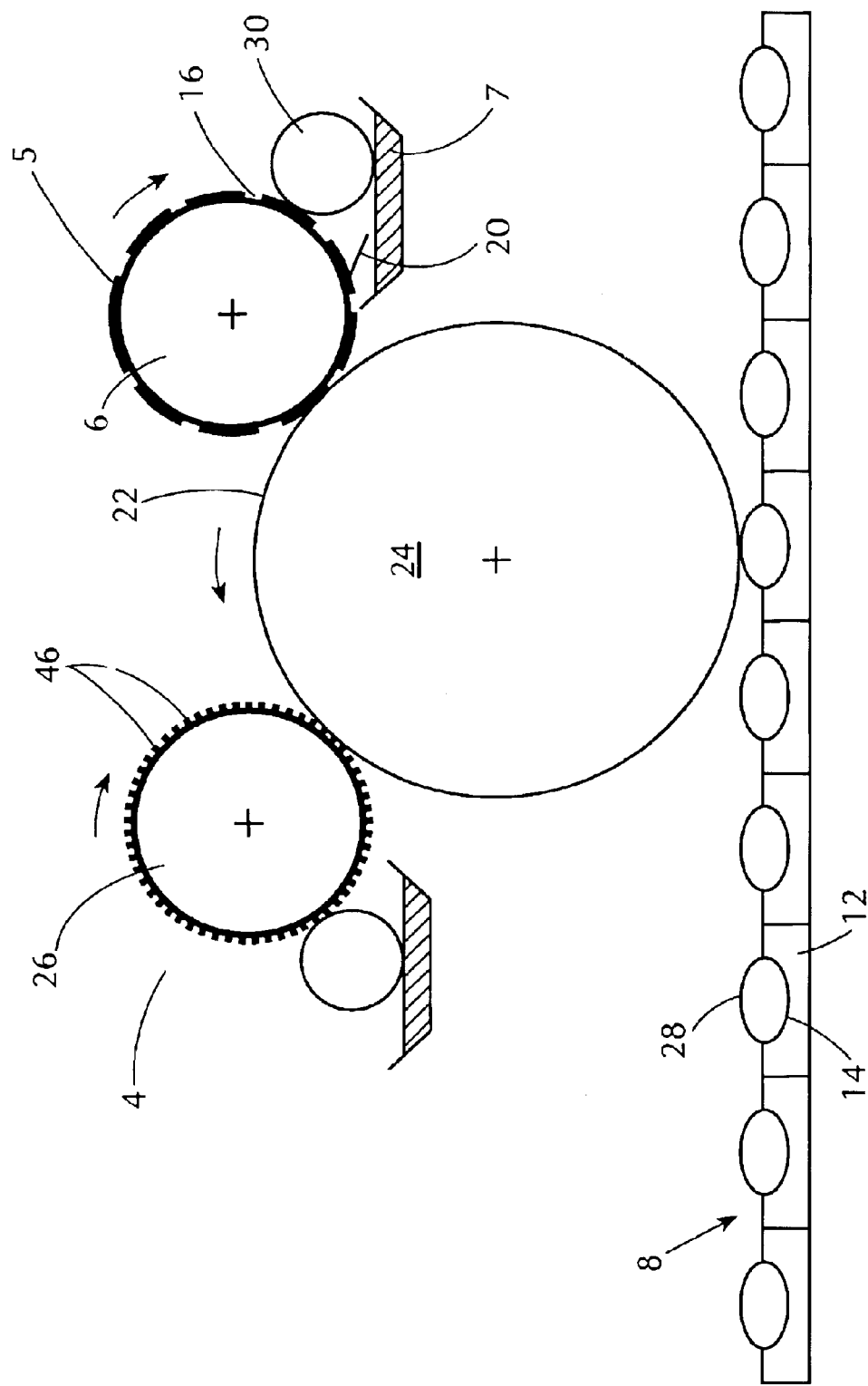
FIG. 1 is a schematic cross-sectional view of an embodiment of an apparatus according to the invention capable of producing multicolor registered images on shaped edible pieces.
Figure 2:
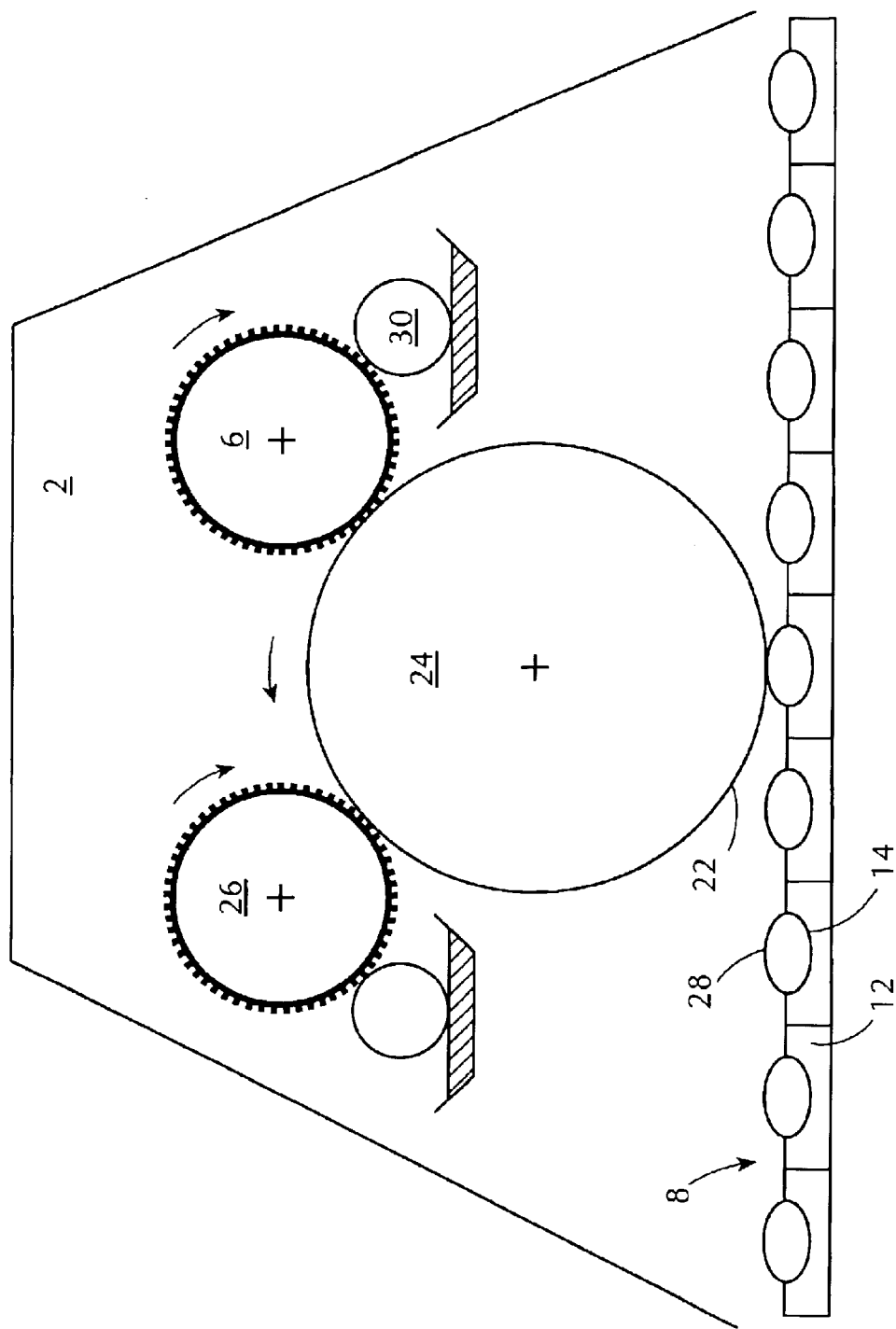
FIG. 2 depicts an embodiment according to the invention using two embossed application rolls.

Embodiments according to the invention are described in FIGS. 1–5. However, the invention is not to be considered limited to the pictured embodiments. FIGS. 1 and 2 represent highly preferred embodiments with respect to the arrangement of embossed and engraved application surfaces. Although two application rolls are shown in the Figures, more than two application rolls can be used at multiple stations, each roll consecutively applying a component image on the image transfer surface.

In a preferred embodiment, as shown in FIG. 1, a first application roll surface 5 has an engraved pattern, and a second application roll surface 4 has an embossed pattern.

As shown in FIG. 1, first color medium is applied from ink roll 30 to an application surface 5 on engraved application roller 6.

Ink roll 30 may be supplied with color medium by rotating in tray 7 containing color medium, as shown in the Figure, or ink roll 30 may have pores (not shown) to allow color medium piped to an interior space of ink roll 30 to reach the surface of ink roll 30. In the latter embodiment, tray 7 acts to catch excess color medium which drips from the roll for recirculation to the ink roll 30.

Figure 5:
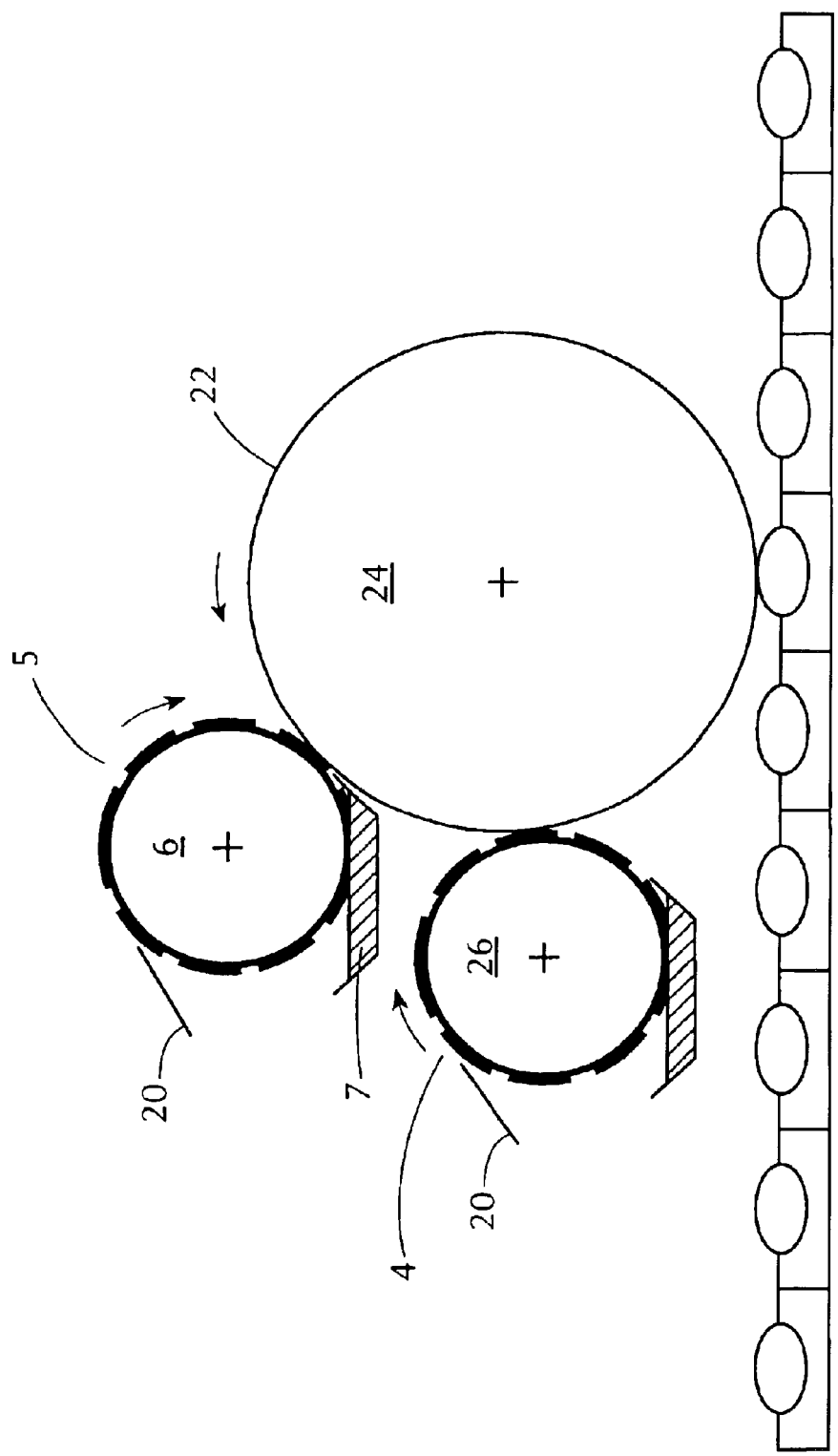
FIG. 5 depicts an embodiment according to the invention using two engraved application rolls and using an alternative color medium supply and alternative application roll placement.

Once applied, the color medium may be removed from non-printing surfaces of engraved roll 6 by a doctor blade 20 so that the color medium is confined to the printed pattern corresponding to the component image. The placement of the doctor blade 20 may be varied depending on the configuration of the color medium supply, as shown in FIG. 1 and FIG. 5, for example. It is also advantageous in some instances to coat non-printing portions of the application surface with a color medium repellent coating.

The application pattern may comprise a pattern of grooves 16 with a well defined pattern for holding ink.

As application roll 6 contacts transfer roll 24, the first component image is transferred from the pattern of grooves 16 in the surface 5 of application roll 6 to the surface 22 of transfer roll 24.

After the first pattern (component image) is applied on the image transfer roll, the image transfer roll rotates to a position where it can be contacted by a second application surface 4, and the above-described process of applying a component image onto the image transfer surface is repeated. It is, of course, critical that the second component image be placed on the image transfer surface in registered relationship with the first component image. This requires proper alignment of the rollers and timing of their rotation, as would be understood by one of ordinary skill in the art. Likewise it is important that the ink from the first image not be smeared or otherwise allowed to bleed into the second image.

Figure 7A:
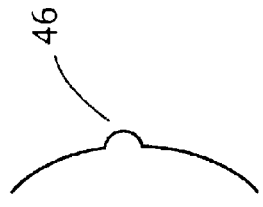
FIG. 7(a), FIG. 7(b), FIG. 7(c) and FIG. 7(d) are schematic views of different types of embossments and engravings that may be used according to different embodiments of the invention.
Figure 7B:
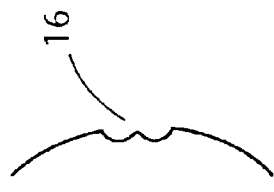

As shown in FIG. 1, second application roll 26 is an embossed roll having an embossed pattern of ridges 46 raised above the remaining surface area of the application roll 26. An expanded view of the embossed pattern of ridges is shown in FIG. 7(b). Color medium is applied to the surface 4 of application roll 26 by ink roll 30. Color medium is ideally transferred only to the raised pattern 46 of the embossed design.

Figure 7C:
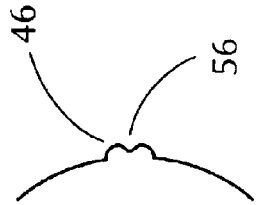

In still further embodiments, the pattern on the application surface is a pattern of ridges 46 provided with indentations 56 to enhance the ability of the ridge to hold ink for the required period, as shown for example in FIG. 7(c).

Figure 7D:
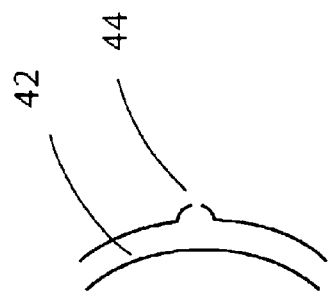

Alternatively, color medium can be continuously supplied through pipes to an interior space 42 of an application roll and supplied to the application surface through small holes 44 drilled in the application surface, as shown in FIG. 7(d). These and other modifications can be developed by those of ordinary skill in the art without departing from the invention.

First and second application surfaces 4 and 5 apply ink to the image transfer surface 22. While not necessary to the effective operation of the invention, the application surfaces are typically surfaces of cylinders 6, 26 rotating in timed relation with the rotation of an image transfer roll 24 and coordinated with the advancement of the conveyer 8. Of course, the critical feature of the application surface is that it be capable of depositing color medium in a pattern on the surface of the image transfer roll. An embossed pattern is particularly useful for the second application roll 26 or any subsequent roll where it is desired not to contact portions of the image transfer surface where the first component image has been applied. This will help to prevent smearing.

Generally, the release characteristics of an embossed or engraved surface can be modified according to the qualities of the color media used. Thus, depending on the viscosity of the color medium used, the release angle of the groove may be optimized to provide for clear, non-smearing deposition of color medium.

The image transfer roll 24 has a soft surface 22 capable of conforming at least partly to a surface of the edible piece. It is important that the printing surface not damage the edible piece. Advantageously the surface of the image transfer roll is made out of a polymeric material such as urethane or soft rubber which conforms to the surface topography of the edible piece.

The registered component image on the surface 22 of transfer roll 24 is then brought into contact with shaped edible piece 28 conveyed in recess 14 of carrier bar 12, which is part of conveyer 8 and the image is transferred to piece 28.

The movement of the shaped edible pieces 28 past the image transfer surface is less complex than in existing technology where complicated systems for keeping the pieces in registration are utilized. The pieces are placed in recesses 14 which are moved in a travelling direction by conveyer 8.

Figure 6:
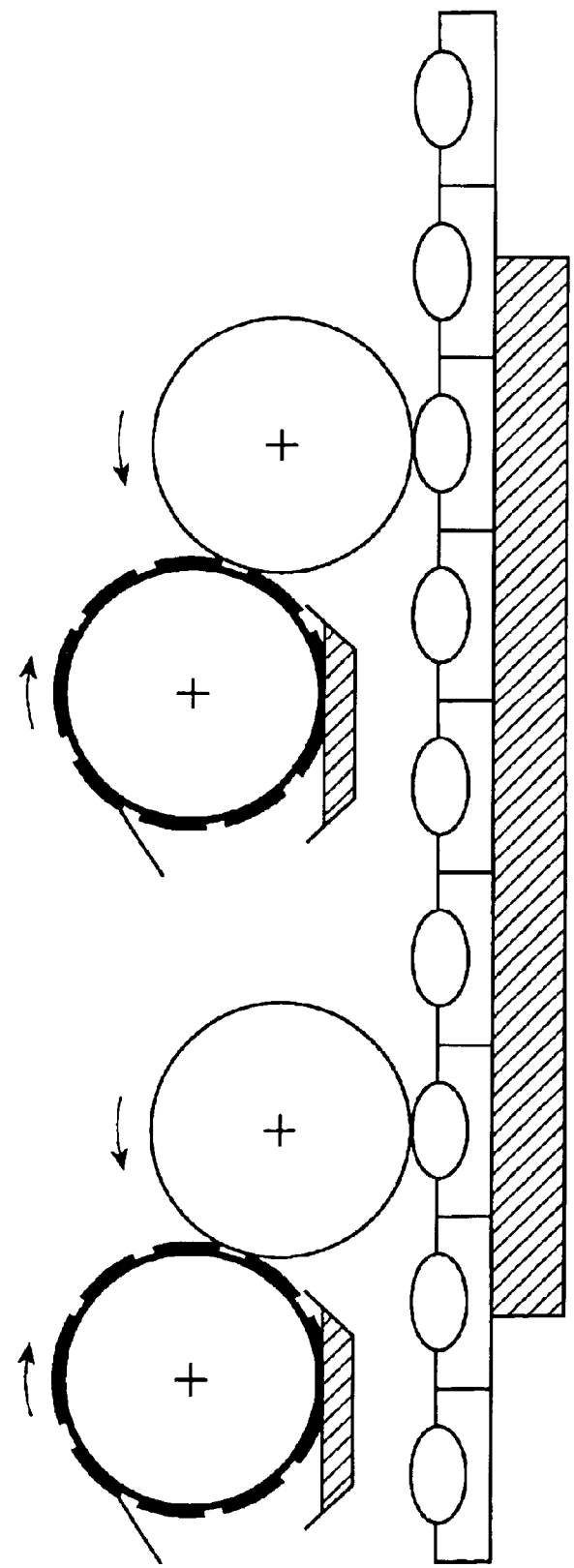
FIG. 6 depicts a two-printer-station printing process not according to present invention, but according to a related embodiment.

Any suitable conveyer having recesses which can hold shaped edible pieces may be used with the invention. In one embodiment, the conveyer comprises a drum having recesses on its peripheral surface which rotates in timed relationship with the rotating image transfer roll. Other conveyer systems known in the art utilize a system of carrier bars 12, such as those depicted in FIGS. 1 and 2. The carrier bars are connected to one another in hinged relationship to form an endless belt-type conveyer. A carrier bar system is disclosed in U.S. Pat. No. 4,672,892, herein incorporated by reference. However, as noted above, the present system of printing registered images does not require a complex system of keeping the pieces in registered relationship, as shown in FIG. 6, between printing stations because a multicolor image is formed in a single contact step.

Although application rolls 6, 26 operating in timed relationship with an image transfer roll 24 and conveyer 8 represents a preferred embodiment, other configurations can be used without departing from the scope of the invention. Alternatively, a planar pad-type application surface could contact the roller in reciprocating relationship. Other configurations may be developed without departing from the invention, provided that the registered image is provided on a single image transfer surface and applied to the shaped edible piece in a single contact step.

The placement of the application surfaces is not critical. As shown in FIG. 5, multiple application rolls 6, 26 can be placed on one side of the image transfer roll 24. When more than two application rolls are used, the placement of the application rolls may be varied accordingly.

Advantageously, the application surface may be metal, which is easily patterned and durable. In preferred embodiments, a patterned metal surface is plated, for example with chromium plating. In other embodiments the application surfaces may include laser etched ceramic surfaces, or an etched polymer surface.

FIG. 2 shows another preferred embodiment where both application surfaces are embossed patterns of ridges on rotatable cylinders. As in the embodiment shown in FIG. 1, the present embodiment has the advantage of reduced tendency to smear the image because the second application roll is embossed and does not contact the first component image already applied to the transfer roll. Generally, the embossed rolls will not tend to need a doctor blade.

Figure 3:
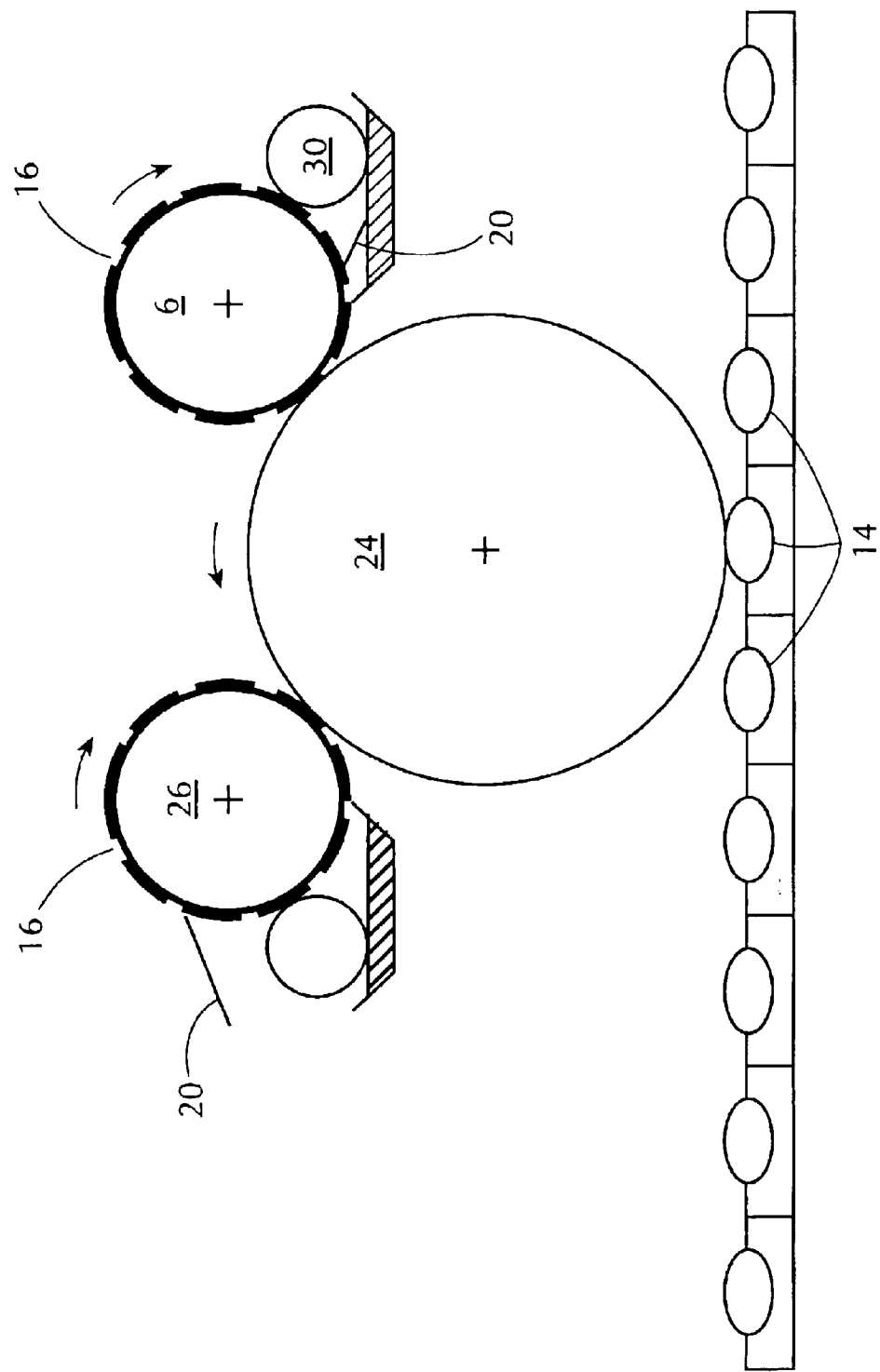
FIG. 3 depicts an embodiment according to the invention using two engraved application rolls.
Figure 4:
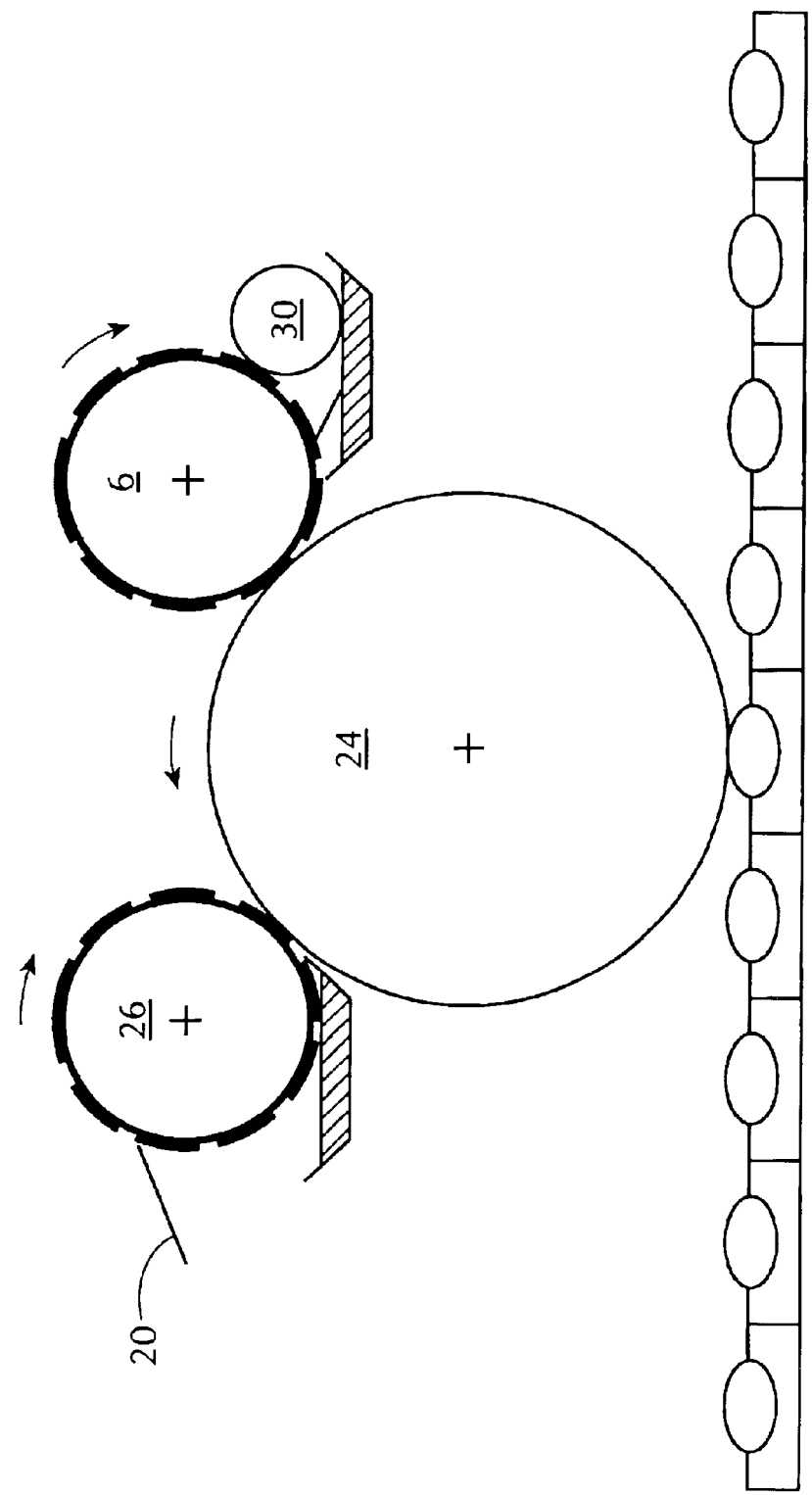
FIG. 4 depicts an embodiment according to the invention using two engraved application rolls and using an alternative color medium supply arrangement.

FIGS. 3 through 5 depict less preferred embodiments, which are, however, within the scope of the invention. In these less preferred embodiments, two engraved application rolls are employed. Where second application roll 26 is an engraved roll, there will be less resistance to smearing of the first component image already on the surface 22 of transfer roll 24. Other embodiments also shown in FIGS. 4 and 5, the application rolls can contact a tray of color medium 7 directly. This is particularly useful when the application roll is engraved. Other color medium supplies can be configured depending on the viscosity of the color medium or other production considerations.

The methods of this invention allow for the printing of registered composite images onto edible pieces at high production rates. Typically the shaped edible pieces will be arranged in rows on the conveyer which has a width capable of accommodating 10 to 30 pieces. It is preferred that the production rate be at least 200,000 edible pieces per hour, more preferably 400,000 edible pieces per hour, and even more preferably 500,000 edible pieces per hour. The production rates above are expressed in terms of total output. The production rate may also be expressed in terms of pieces per hour per lane, in a multi-lane machine. In a preferred embodiment, the production rate is preferably at least 1,000 pieces per hour per lane, more preferably greater than 10,000 pieces per hour per lane, and most preferably greater than 37,715 pieces per hour per lane.

In some instances it is necessary to control the environment in which patterns are formed on the image transfer surface. For this purpose, an enclosure 2 may be provided. The temperature and relative humidity inside the enclosure can be maintained for optimum image formation, depending on the formulation of the inks and the surface characteristics of the shaped edible pieces. It will be readily understood by those of ordinary skill in the art that a challenge facing the artisan is ensuring that the image formed by application surface 5 must be such that it does not smear when a second image is formed by application surface 4, while at the same time ensuring that the condition of both images together is in an appropriate state on the image transfer surface to apply a multicolor registered image on the shaped edible piece.

As described above, multicolor printing refers to the formation of an image (a composite image), which can be, for example, graphic, type, or mixture of type and graphic, from a sequence of component images. Each component image can also be graphic and/or type and each component image can be a different color, the same color, a different hue, or a different value of a color. Each component image can be formed for example from lines, dots, solid colored areas, varying color density areas, or mixtures.

Figure 8:
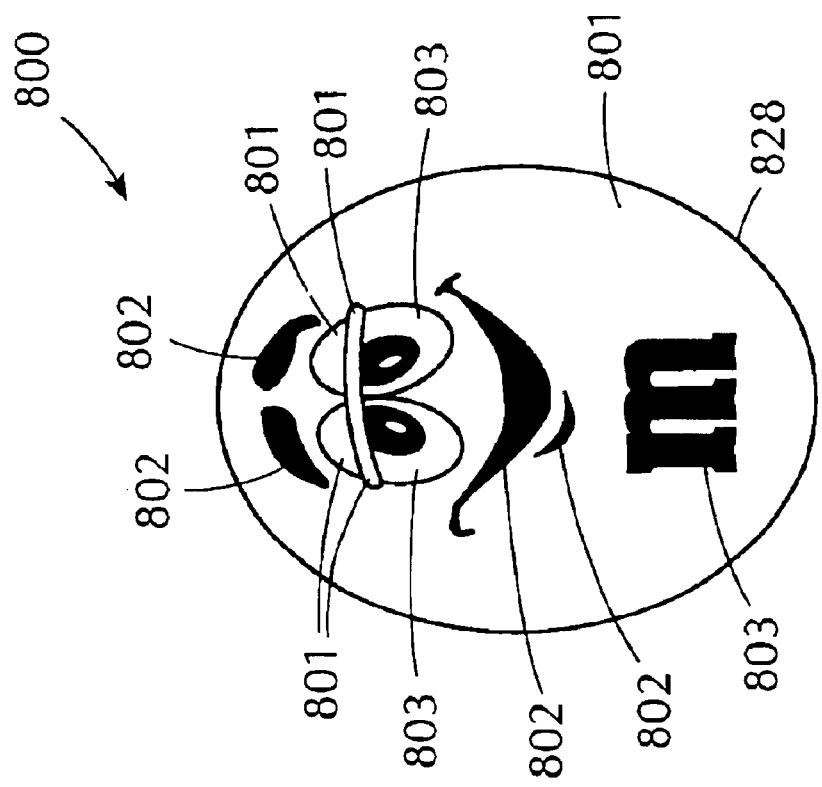
FIG. 8 is an exemplary multicolor registered image (not shown in color) which may be printed in a single contact step according to the invention.

An exemplary image is depicted in FIG. 8, wherein a multicolored registered composite image 800 is shown formed on a lentil confectionary piece 828. The registered image is composed of a first component image 802 of a first color and a second component image 803 of a second color printed on a background 801.

Other variations and modifications of this invention will be apparent to those skilled in this art after careful study of this application. This invention is not to be limited except as set forth in the following claims.

What is claimed is:

1. An apparatus for printing a multicolor registered image on a surface of an edible piece, comprising:
   a conveyer for transporting at least one edible piece;
   a continuously or intermittently rotatable cylinder image transfer surface for contacting said piece for transferring the multicolored registered image onto said edible piece;
   a first edible color medium supply of a first color;
   a first application surface in operative communication with said first edible color medium supply and in contact with said image transfer surface for applying a first pattern of edible color medium of said first color to said image transfer surface;
   a second edible color medium supply of a second color;
   a second application surface in operative communication with said second color medium supply and in contact with said image transfer surface for applying a second pattern of edible color medium of said second color to said image transfer surface;
   wherein said first and second patterns of edible color medium are registered on said image transfer surface and the registered image is transferred in one contact step to a surface of the edible piece,
   wherein at least one of said first and second application surfaces is a surface of a continuously or intermittently rotatable cylinder having an engraved pattern or an embossed pattern, and
   wherein said first application surface has an engraved pattern or an embossed pattern and said second application surface has an embossed pattern, and
   wherein said first and second application surfaces each enclose an interior space for receiving the first and second color medium supplies, respectively, and the first and second application surfaces have a plurality of holes for providing color medium from said interior spaces to the first and second application surfaces, respectively.

2. The apparatus of claim 1, wherein said edible piece is a shaped edible piece and said image transfer surface conforms at least partially to a surface of said shaped edible piece.

3. The apparatus of claim 1, wherein a plurality of recesses are situated on said conveyer.

4. The apparatus of claim 3, wherein said conveyer comprises multiple carrier bars, each carrier bar having multiple recesses capable of holding a shaped edible piece.

5. The apparatus of claim 1, wherein said conveyer is a multiple lane drum conveyer.

6. The apparatus of claim 1, wherein at least one of said first and second color medium supply comprises an ink roll.

7. The apparatus of claim 1, comprising an enclosure surrounding the apparatus adapted to maintain controlled temperature and relative humidity inside said enclosure.

8. The apparatus of claim 1, further comprising at least one additional application surface in operative communication with at least one additional edible color medium supply and in contact with said image transfer surface for applying at least one additional pattern of edible color medium to said image transfer surface, wherein said first, second and additional patterns of edible color medium are registered on said image transfer surface.

9. An apparatus for printing a multicolor registered image on a surface of an edible piece, comprising:
   a conveyer for transporting at least one edible piece;
   a continuously or intermittently rotatable cylinder image transfer surface for contacting said piece for transferring the multicolored registered image onto said edible piece;
   a first edible color medium supply of a first color;
   a first application surface in operative communication with said first edible color medium supply and in contact with said image transfer surface for applying a first pattern of edible color medium of said first color to said image transfer surface;
   a second edible color medium supply of a second color;
   a second application surface in operative communication with said second color medium supply and in contact with said image transfer surface for applying a second pattern of edible color medium of said second color to said image transfer surface;
   wherein said first and second patterns of edible color medium are registered on said image transfer surface and the registered image is transferred in one contact step to a surface of the edible piece,
   wherein said first application surface is a surface of a continuously or intermittently rotatable cylinder having an engraved pattern and said second application surface is a surface of a continuously or intermittently rotatable cylinder having an embossed pattern.

10. An apparatus for printing a multicolor registered image on a surface of an edible piece, comprising:
    a conveyer for transporting at least one edible piece;
    a continuously or intermittently rotatable cylinder image transfer surface for contacting said piece for transferring the multicolored registered image onto said edible piece;
    a first edible color medium supply of a first color;
    a first application surface in operative communication with said first edible color medium supply and in contact with said image transfer surface for applying a first pattern of edible color medium of said first color to said image transfer surface;
    a second edible color medium supply of a second color;
    a second application surface in operative communication with said second color medium supply and in contact with said image transfer surface for applying a second pattern of edible color medium of said second color to said image transfer surface;
    wherein said first and second patterns of edible color medium are registered on said image transfer surface and the registered image is transferred in one contact step to a surface of the edible piece,
    wherein at least one of said first and second application surfaces is a surface of a continuously or intermittently rotatable surface having an embossed pattern, and
    wherein at least a portion of said embossed pattern comprises ridges provided with indentations for holding ink.

11. An apparatus for printing a multicolor registered image on a surface of an edible piece, comprising:

a conveyer for transporting at least one edible piece;

an continuously or intermittently rotatable cylinder image transfer surface for contacting said piece for transferring the multicolored registered image onto said edible piece;

a first edible color medium supply of a first color;

a first application surface in operative communication with said first edible color medium supply and in contact with said image transfer surface for applying a first pattern of edible color medium of said first color to said image transfer surface;

a second edible color medium supply of a second color;

a second application surface in operative communication with said second color medium supply and in contact with said image transfer surface for applying a second pattern of edible color medium of said second color to said image transfer surface;

wherein said first and second patterns of edible color medium are registered on said image transfer surface and the registered image is transferred in one contact step to a surface of the edible piece;

wherein said first application surface is a continuously or intermittently rotatable surface having an engraved pattern or an embossed pattern and said second application surface has an embossed pattern;

wherein an unpatterned portion of said at least one of said image application surfaces is coated with a coating repellent to the first or second color medium.

12. An apparatus for printing a multicolor registered image on a surface of a shaped edible piece, comprising:

a conveyer for transporting a plurality of shaped edible pieces past a printing station where the shaped edible pieces contact an image transfer roll;

recesses situated in the conveyer for retaining individual shaped edible pieces;

a cylindrical image transfer roll having a surface for contacting and conforming at least partly to a surface of said shaped edible piece at said printing station;

a first edible color medium supply in operative communication with a first cylindrical application roll having an engraved pattern in contact with said image transfer roll for applying a first pattern of food grade ink of a first color to the surface of said image transfer roll;

a second edible color medium supply operatively connected to a second cylindrical application roll having an embossed pattern in contact with said image transfer roll for applying a second pattern of food grade ink of a second color to the surface of said image transfer roll in registration with said first pattern;

wherein said first and second patterns of food grade ink are transferred in a single contact step onto a surface of the shaped edible piece to produce a multicolored registered image.

13. A method for printing multicolor registered images on a plurality of edible pieces having sugar shells with non-planar surfaces comprising the steps of:

placing an edible piece having a sugar shell with a non planar surface on a conveyer and transporting the edible piece to a printing station;

supplying a first edible color medium of a first color to a pattern of grooves or ridges in a first application surface;

contacting the pattern in the first application surface with a rotatable image transfer surface to apply a first pattern of edible color medium onto said image transfer surface;

rotating said image transfer surface past a position where said image transfer surface contacts said first application surface;

supplying a second edible color medium of a second color to a second pattern of grooves or ridges in a second application surface;

contacting the second pattern in the second application surface with the rotatable image transfer surface to apply a second pattern of edible color medium onto said image transfer surface in registration with said first pattern;

rotating the image transfer surface past a position where said image transfer surface contacts the second application surface; and contacting the edible piece on said conveyer at said printing station with the image transfer surface to print a multicolor registered image on said edible piece, wherein said first application surface has an engraved pattern, and wherein said second application surface is a surface of a continuously or intermittently rotatable surface having an embossed pattern.

14. The method of claim 13, wherein said first and second color medium comprise food colorings.

15. The method of claim 13, wherein said first and second color medium consist essentially of aqueous or water/alcohol based food grade inks.

16. The method of claim 13, wherein said edible piece is a shaped edible piece.

17. The method of claim 13, further comprising providing an environment of controlled relative humidity and temperature to an enclosure surrounding said image transfer surface.

18. The method of claim 16, wherein a plurality of shaped edible pieces is transported in a plurality of recesses on said conveyer.

19. The method of claim 18, wherein said step of transporting includes simultaneously transporting multiple lanes of shaped edible pieces past said image transfer surface.

* * * * *

UNITED STATES PATENT AND TRADEMARK OFFICE
CERTIFICATE OF CORRECTION

PATENT NO. : 6,823,795 B2 Page 1 of 1
APPLICATION NO. : 09/859141
DATED : November 30, 2004
INVENTOR(S) : Neil A. Willcocks et al.

It is certified that error appears in the above-identified patent and that said Letters Patent is hereby corrected as shown below:

COLUMN 2

Line 55, "DRAWING" should read --DRAWINGS--.

COLUMN 3

Line 5, "present" should read --the present--.

COLUMN 10

Line 4, "non" should read --non- --.

Signed and Sealed this

Sixth Day of March, 2007

JON W. DUDAS
*Director of the United States Patent and Trademark Office*